(12) United States Patent
Jourdan

(10) Patent No.: US 7,143,676 B2
(45) Date of Patent: Dec. 5, 2006

(54) VISE CARRIAGE AND SUPPORT MECHANISM

(75) Inventor: James K. Jourdan, Fond-du-Lac, WI (US)

(73) Assignee: Marvel Manufacturing Co., Inc., Oshkosh, WI (US)

( * ) Notice: Subject to any disclaimer, the term of this patent is extended or adjusted under 35 U.S.C. 154(b) by 37 days.

(21) Appl. No.: 10/936,349

(22) Filed: Sep. 7, 2004

(65) Prior Publication Data

US 2006/0048620 A1 Mar. 9, 2006

(51) Int. Cl.
*B26D 7/06* (2006.01)
*B65G 39/00* (2006.01)

(52) U.S. Cl. ..................... 83/412; 83/436.7; 198/345.2

(58) Field of Classification Search .................. 83/651, 83/209, 210, 228, 240, 705, 706, 412, 415, 83/435.11, 435.23, 436.1, 436.7, 76; 198/345.1, 198/345.2, 345.3, 346.3
See application file for complete search history.

(56) References Cited

U.S. PATENT DOCUMENTS

| | | | |
|---|---|---|---|
| 3,474,693 A | 10/1969 | Wilkie et al. ............ 83/201.07 |
| 3,504,585 A | 4/1970 | Harris ............................ 83/42 |
| 3,841,462 A | 10/1974 | Schmidt ...................... 198/39 |
| 4,111,085 A | 9/1978 | Johnson ........................... 83/1 |
| 4,179,961 A | 12/1979 | Harris .......................... 83/206 |
| 4,463,845 A | 8/1984 | Harris .......................... 198/341 |
| 4,519,284 A | 5/1985 | Hunter et al. ................ 83/410 |
| 4,605,115 A | 8/1986 | Genans ........................ 198/341 |
| 4,823,662 A | 4/1989 | Stolzer ........................ 83/150 |
| 4,944,339 A | 7/1990 | Luyten ........................ 144/363 |
| 5,148,907 A | 9/1992 | Tokiwa ........................ 198/468 |
| 5,353,910 A | 10/1994 | Harris et al. ............. 198/345.1 |
| 6,698,159 B1 | 3/2004 | Harris et al. .................. 53/247 |

*Primary Examiner*—Charles Goodman
(74) *Attorney, Agent, or Firm*—Baker & McKenzie LLP; David I. Roche

(57) ABSTRACT

A roller table with a vise carriage and movable roller supports for moving, positioning, and supporting material. In the preferred embodiment, a hydraulic cylinder and piston rod are used in conjunction with a rack and pinion system such that there is a doubling effect on the piston rod stroke for effectuating differential positioning of two movable roller supports and the vise carriage. One movable roller support is disposed at approximately the midpoint between the vise carriage and a fixed vise. For a given displacement of the vise carriage, the movable roller support travels half as far so as to remain essentially at the midpoint of the span. The second movable roller support is disposed on the other side of the vise carriage, more or less at the midpoint between the vise carriage and a fixed roller support. The second movable roller support is integral with the first movable roller support and, thus, also travels half as far as the vise carriage for a given displacement so as to remain essentially at the midpoint between the vise carriage and the fixed roller.

26 Claims, 7 Drawing Sheets

VISE CARRIAGE AND SUPPORT MECHANISM

BACKGROUND AND SUMMARY OF THE INVENTION

The present invention relates generally to a material feed system for a cutting machine, and relates specifically to the simultaneous movement of a vise carriage and moveable support rollers for moving, positioning, and supporting material on a roller table.

It is well known to use a roller table having a vise carriage, also referred to as a shuttle vise, for movement of material to and from a cutting machine. For effectuating movement of the vise carriage, it is known in the art to use belts and pulleys, drive screws and drive sleeves, hydraulic cylinders and piston rods, or racks and pinions, as described in U.S. Pat. Nos. 4,241,630 and 6,698,159. Specifically, U.S. Pat. No. 4,241,630 teaches how to move a vise carriage by mounting a hydraulic cylinder to the frame of the roller table and attaching the distal end of the piston rod to the vise carriage. It is also known in the art to use a rack-and-pinion system to control movement of the vise carriage wherein the rack is fixed to the vise carriage and the pinion is fixed to the frame of the table. With such a configuration the movement of the vise carriage can be controlled via a servomotor or a manual crank attached to the pinion.

There are some drawbacks with the currently known means of effectuating movement of a vise carriage. For example, when a hydraulic cylinder and piston rod are used, the vise carriage's range of movement is limited to the stroke of the hydraulic cylinder, effectively limiting the range of movement of the vise carriage to less than half the length of the table.

It is also well known to use a series of rollers for supporting and allowing free movement of material on a roller table. Generally, a series of fixed rollers are provided and are located equally spaced along the length of the table. Such a configuration would require the vise carriage to have an overhead support tying both sides of the vise together in order to allow the vise carriage to freely pass over the rollers. An overhead support, however, is problematic because it prevents the loading of material from above the vise.

To obviate the need for an overhead support, a first alternative known in the art is to exclude roller supports from within the range of movement of the vise carriage and include roller supports fixedly attached to the vise carriage. An example of such a design is the Armstrong-Blum Marvel Series 81 APC Sawing System. However, those in the industry have experienced problems with shorter pieces of material falling into the open area between the roller supports which are attached to the vise carriage and the adjacent roller supports which are attached to the frame of the table.

To minimize the unsupported span of material, it is known in the art to include a movable roller support which is situated adjacent to the movable vise carriage. The movable roller support is attached to the vise carriage in such a manner that, when the vise carriage is moved away from the roller support, the roller support remains stationary until it is a predetermined distance from the vise carriage, at which point the roller support moves with the vise carriage. Likewise, when the vise carriage is moved towards the roller support, the roller support remains stationary until the vise carriage abuts the roller support, at which point the roller support moves with the vise carriage. This means of support is also not preferable because the operation of the roller support is not smooth; the roller support is impacted or jerked by the vise carriage when it begins to move.

Thus, there is a need for increasing the stroke of a vise carriage when used in combination with a hydraulic cylinder and piston rod. Also, there is a need for improved support for a piece of material being moved by a vise carriage. It is therefore a primary object of the invention described and claimed herein to provide a mechanism to multiply the stroke of a hydraulic cylinder and piston rod to provide a wide range of movement for a movable vise carriage. It is a further object of the inventions described and claimed herein to provide a movable support which moves smoothly in concert with the vise carriage for minimizing the unsupported length of material being moved by the vise carriage. It is another object of the inventions describe and claimed herein to provide means for material support for a roller table having a vise carriage without an overhead support. It is another object of the inventions described and claimed herein to provide a mechanism to effectuate concurrent movement of the roller support and vise carriage.

The present invention solves the problems inherent in existing designs by providing moveable roller supports which move in chorus with a moveable vise carriage to ensure that the length between adjacent material support points are minimized. In the preferred embodiment of the present invention, there are two moveable roller supports. The first movable roller support is located approximately at the midpoint of the span between the moveable vise carriage and a stationary vise. The second movable roller support is located on the opposite side of the movable vise carriage and is integral with the first movable roller support. Throughout the entire stroke of the moveable vise carriage, the moveable roller supports move concurrently such that the first support is always located at approximately the midpoint of the span. In an alternative embodiment, the moveable roller supports are located at predetermined locations and move at approximately half the velocity of the moveable vise carriage. In yet another embodiment, the moveable roller supports are located at predetermined locations and, for a given distance traveled by the moveable vise carriage, the moveable roller supports move approximately half that distance. Alternatively, the moveable roller supports can move at some other predetermined ratio of the velocity or the traveled distance of the movable vise carriage. In yet another alternative embodiment, there can be any number of movable roller supports which integrally or independently move.

The preferred means for controlling the movement of the roller supports and the vise carriage is a mechanism comprised of a hydraulic cylinder and piston rod used in combination with a rack-and-pinion system to provide a doubling effect on the stroke of the hydraulic cylinder. The hydraulic cylinder is fixed to the frame of the table and the piston rod movably extends from the hydraulic cylinder. The rack-and-pinion system has a pinion attached to the distal end of the piston rod and has two racks, one of which is fixed to the frame of the machine while the other is attached to the movable vise carriage. The two racks are located opposite each other along a diameter of the pinion and are parallel to the length of the machine (parallel to the direction of material movement). In a typical rack and pinion system, the pinion is stationary and is powered either by a hand crank or a servomotor. However, in the present invention, the pinion moves laterally (because it is attached to the distal end of the piston rod), while simultaneously engaging with the rack which is fixed to the frame and engaging with the rack which is attached to the movable vise carriage. This configuration effectively causes the movable vise carriage to move twice the distance and velocity of the piston rod. This configuration allows for a doubling of the stroke of the hydraulic cylinder and piston rod; i.e., the range of movement of the movable vise carriage is twice the stroke of the piston rod. The movable support is fixed to the pinion and the piston rod and, thus, will move half at half the velocity and distance as the movable vise carriage.

One skilled in the art will understand that the movement of the movable vise carriage and movable roller support can be controlled electronically. This would likely entail using a computer in combination with potentially separate means for effectuating movement of the of the vise carriage and roller supports. The mean for effectuating movement could include servomotors, hydraulic cylinders and piston rods, rack-and-pinions, pulley systems, and/or drive screws and drive sleeves.

BRIEF DESCRIPTION OF THE DRAWINGS

These and other features, aspects, objects, and advantages of the inventions described and claimed herein will become better understood upon consideration of the following detailed description, appended claims, and accompanying drawings where:

Figure 1:
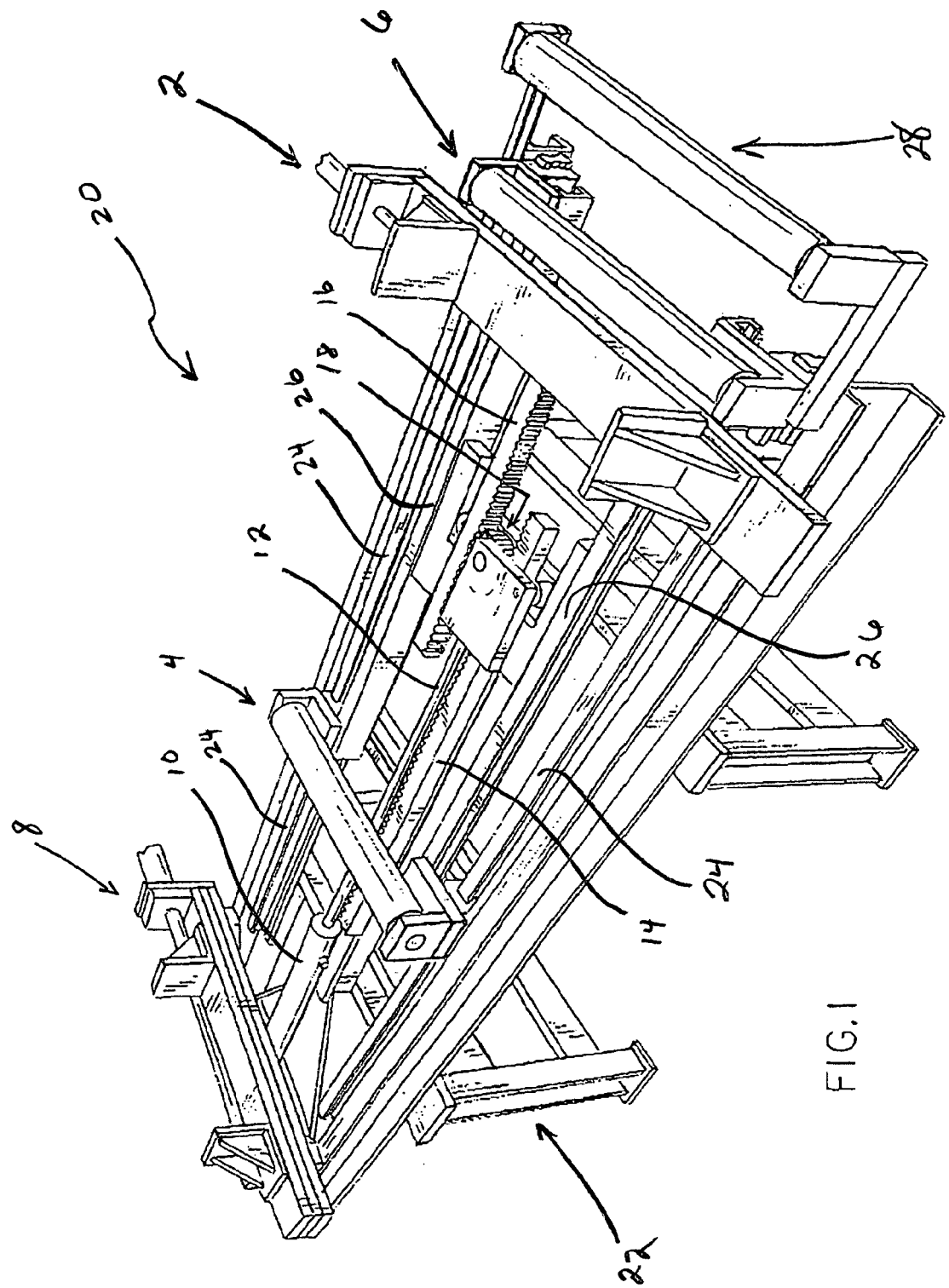
FIG. 1 is a perspective view of a roller table made in accordance with the inventions described and claimed herein.

It should be understood that the drawings are not necessarily to scale and that the embodiments are sometimes illustrated by graphic symbols, phantom lines, diagrammatic representations and fragmentary views. In certain instances, details which are not necessary for an understanding of the inventions described and claimed herein or which render other details difficult to perceive may have been omitted. It should be understood, of course, that the inventions described herein are not necessarily limited to the particular embodiments illustrated herein.

Like reference numerals will be used to refer to like or similar parts from Figure to Figure in the following description of the drawings.

DETAILED DESCRIPTION OF AN EMBODIMENT OF THE PRESENT INVENTION

Referring first to FIG. 1, a perspective view of a preferred embodiment of a roller table 20, according to the present inventions described herein, is shown. Roller tables 20 are generally used in conjunction with cutting machines to feed, support and position material, although the present invention can be used in other applications which require a material feed system. The preferred embodiment of the roller table 20 includes a movable vise carriage 2 and a pair of movable roller supports 4 and 6, all of which are disposed on a pair of rails 24. The pair of rails 24 are fixed to the frame 22 of the roller table 20, and run along the length of the roller table 20 to define the range of movement for the vise carriage 2 and the movable roller supports 4 and 6. The first movable roller support 4 is preferably located approximately at the midpoint of the span between the movable vise carriage 2 and a stationary vise 8, which is fixed to the frame 22 of the roller table 20. The second movable roller support 6 is preferably located on the opposite side of the vise carriage 2, more or less at the midpoint of the span between the vise carriage 2 and a fixed roller support 28. In the preferred embodiment, the first movable roller support 4 is integral with the second movable roller support 6, being connected by a pair of support members 26 which run lengthwise underneath the vise carriage 2. Alternative embodiments of the present invention could include any number of movable roller supports, integral or independent of one another, and any number of fixed roller supports (fixed to the frame 22).

Figure 2:
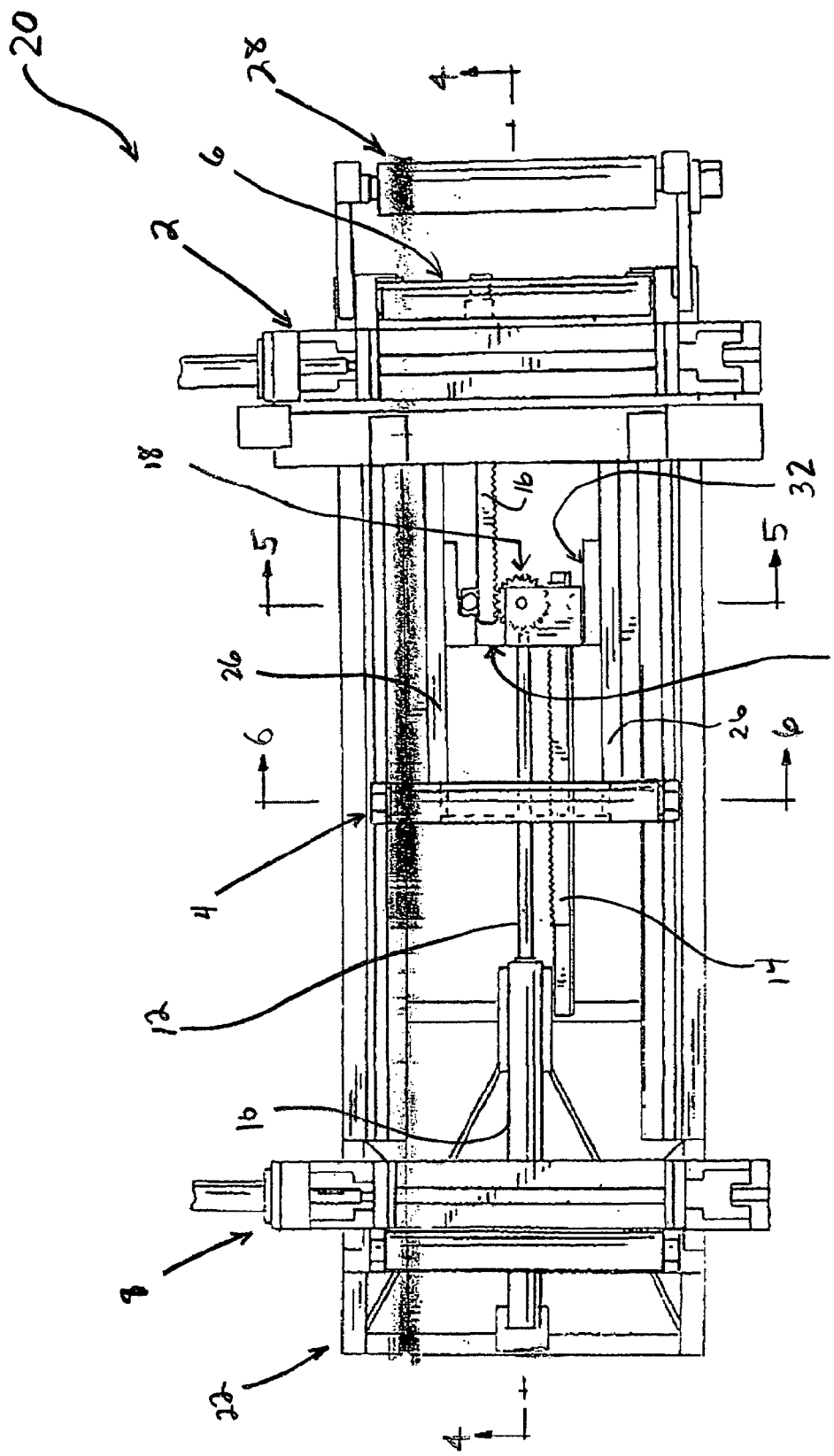
FIG. 2 is a top view of the roller table with the piston in an extended position.
Figure 4:
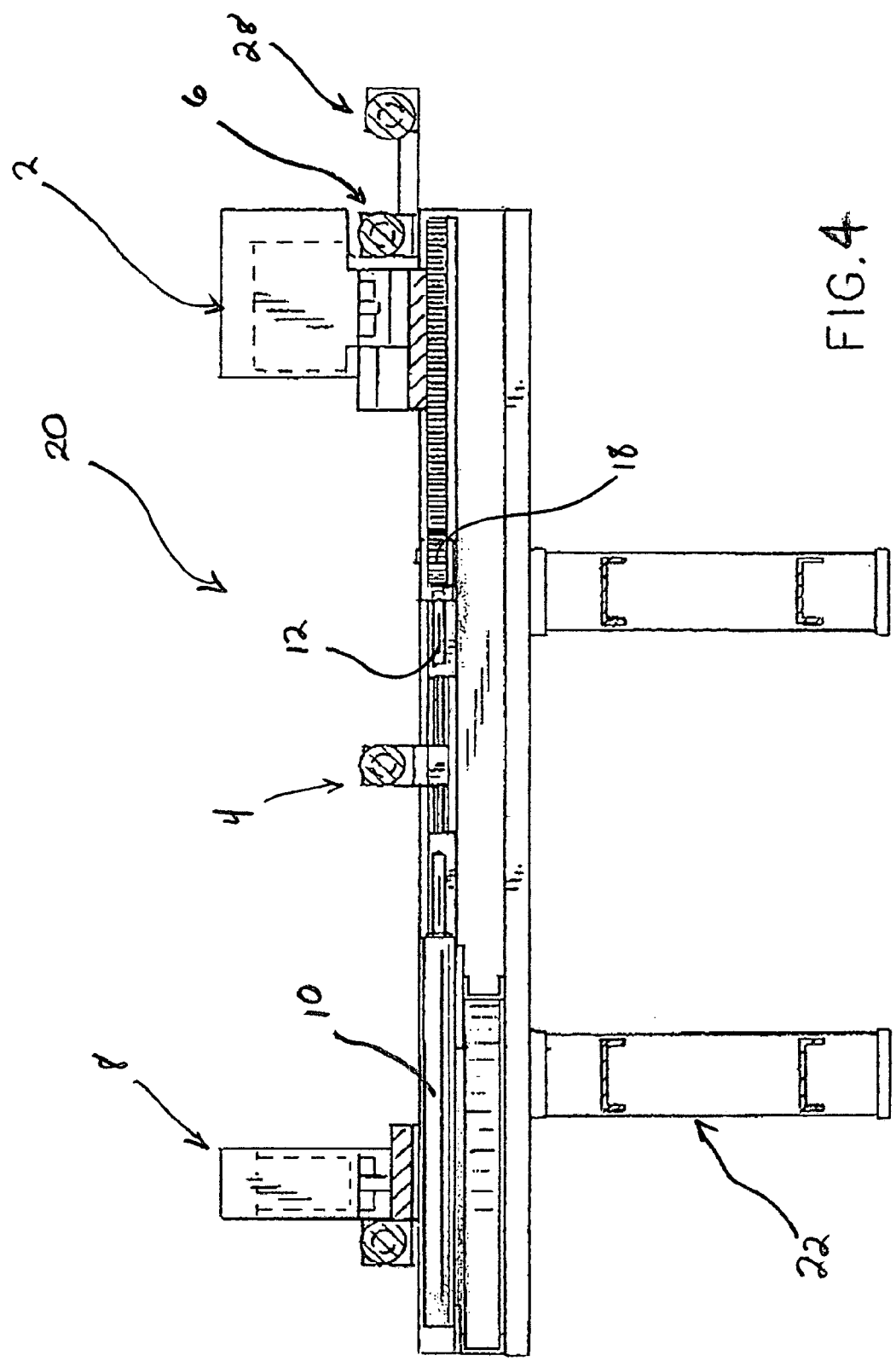
FIG. 4 is a sectional view of the roller table, defined as Section 4—4 in FIG. 2
Figure 5:
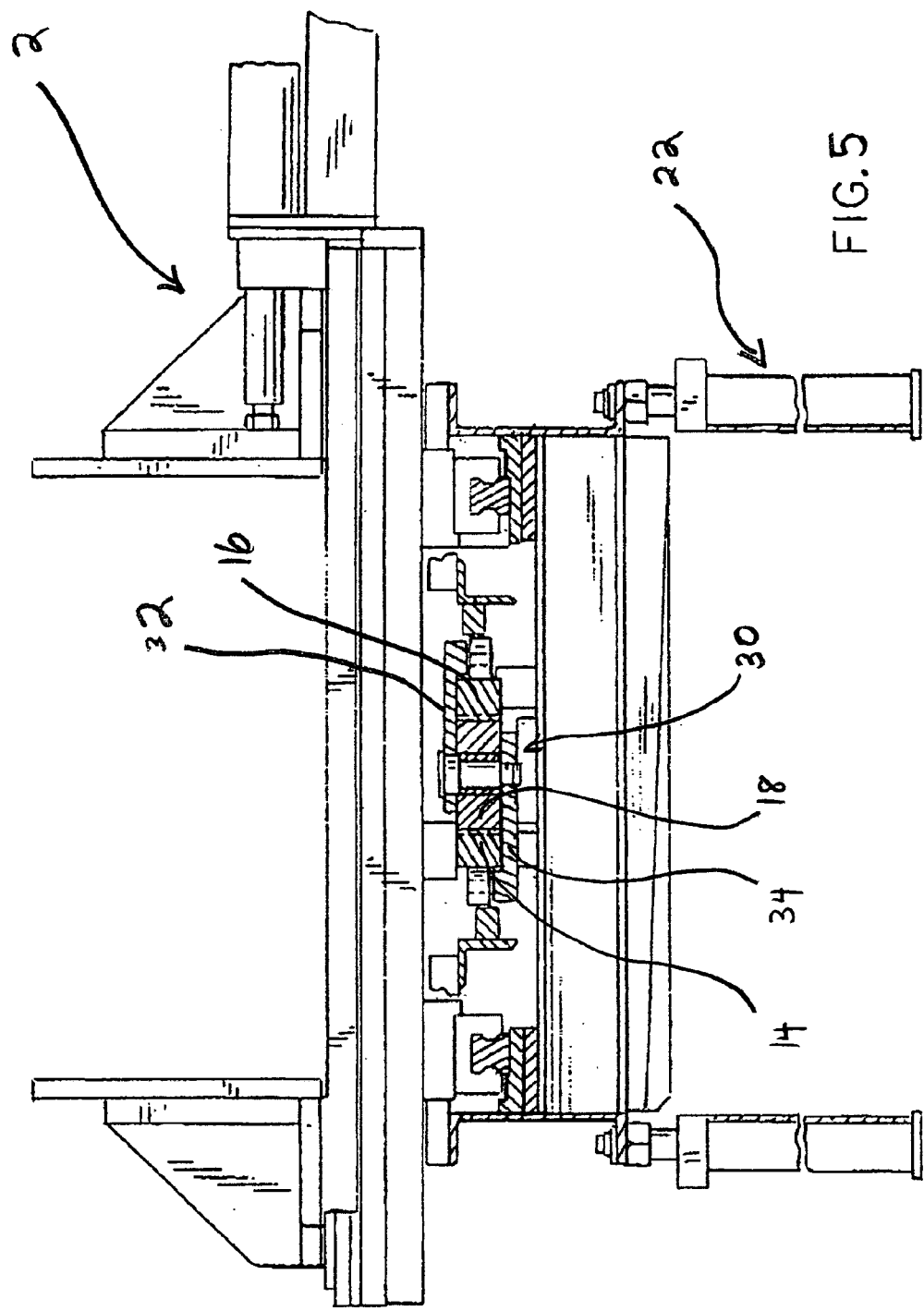
FIG. 5 is a sectional view of the roller table, defined as Section 5—5 in FIG. 2
Figure 6:
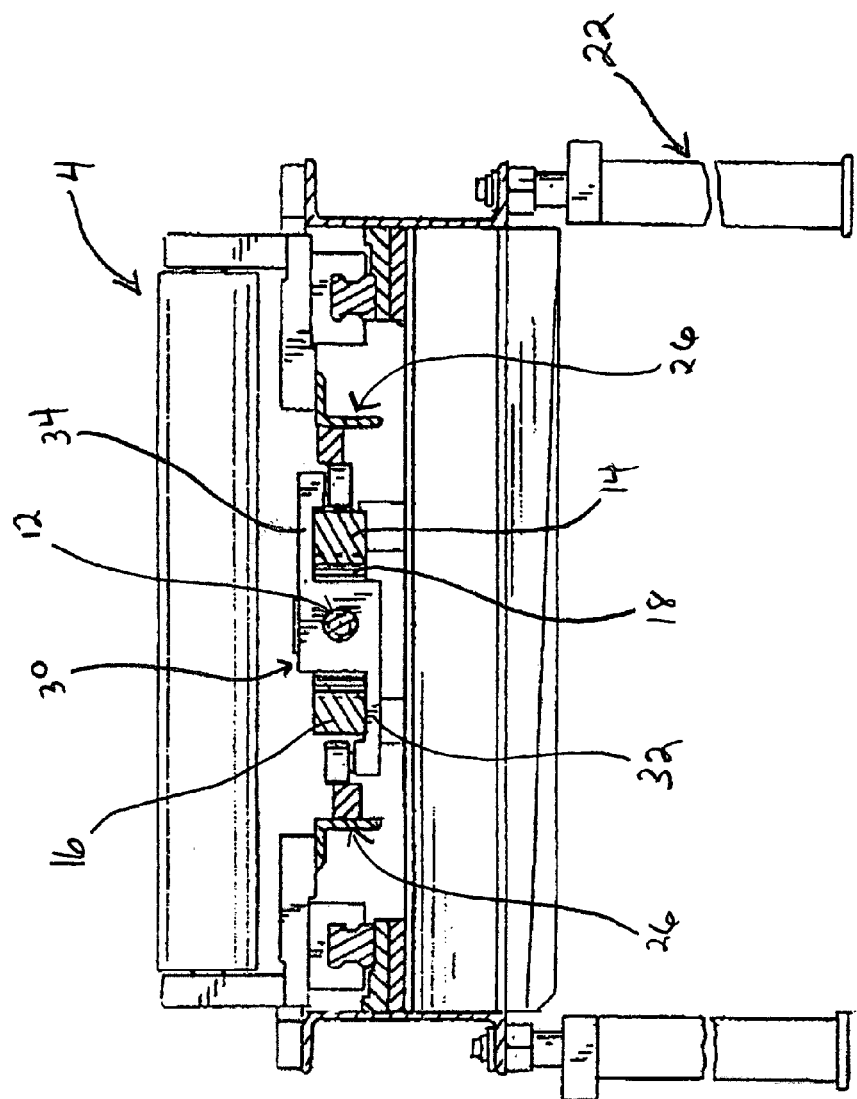
FIG. 6 is a sectional view of the roller table, defined as Section 6—6 in FIG. 2

Referring now to FIGS. 2 and 4, the preferred roller table 20 includes a hydraulic cylinder 10, which is fixed to the frame of the roller table 20, and a piston rod 12, which extends from the hydraulic cylinder, for effectuating movement of the movable roller supports 4 and 6. An interconnecting member 30 integrates the pair of support members 26 with the distal end of the piston rod 12, such that the movable roller supports 4 and 6 move at the same rate as the piston rod 12. The structure of the interconnecting member 30 is better shown by the cross-sectional views in FIG. 5 and FIG. 6. To effectuate movement of the vise carriage 2, a pinion 18 is rotateably disposed between a top plate 32 and bottom plate 34 of the interconnecting member 30. Referring again to FIG. 2, a first rack 14 is fixed to the frame 22 of the roller table 20 and is engaged with the pinion 18. A second rack 16 engages with the pinion 18, diametrically opposite of the first rack 14, and is attached to the vise carriage 2. The pinion 18, the axis of which moves integrally with the distal end of the piston rod 12 (being connected via the interconnecting member 30), engages with the first and second racks 14 and 16 in such a manner as to have a doubling effect on the stroke of the piston rod 12; i.e., the vise carriage 2 moves at twice the rate of the piston rod 12.

Given that the movable roller supports 4 and 6 are integral with the piston rod 12 and, thus, move at half the rate of the vise carriage 2 in the preferred embodiment, the first movable roller support 4 will be located at approximately the midpoint of the span between the vise carriage 2 and the stationary vise 8 throughout the entire range of movement of the vise carriage 2. Likewise, the second movable roller support 6 will always be located at approximately the midpoint of the span between the vise carriage 2 and the fixed roller support 28.

Figure 3:
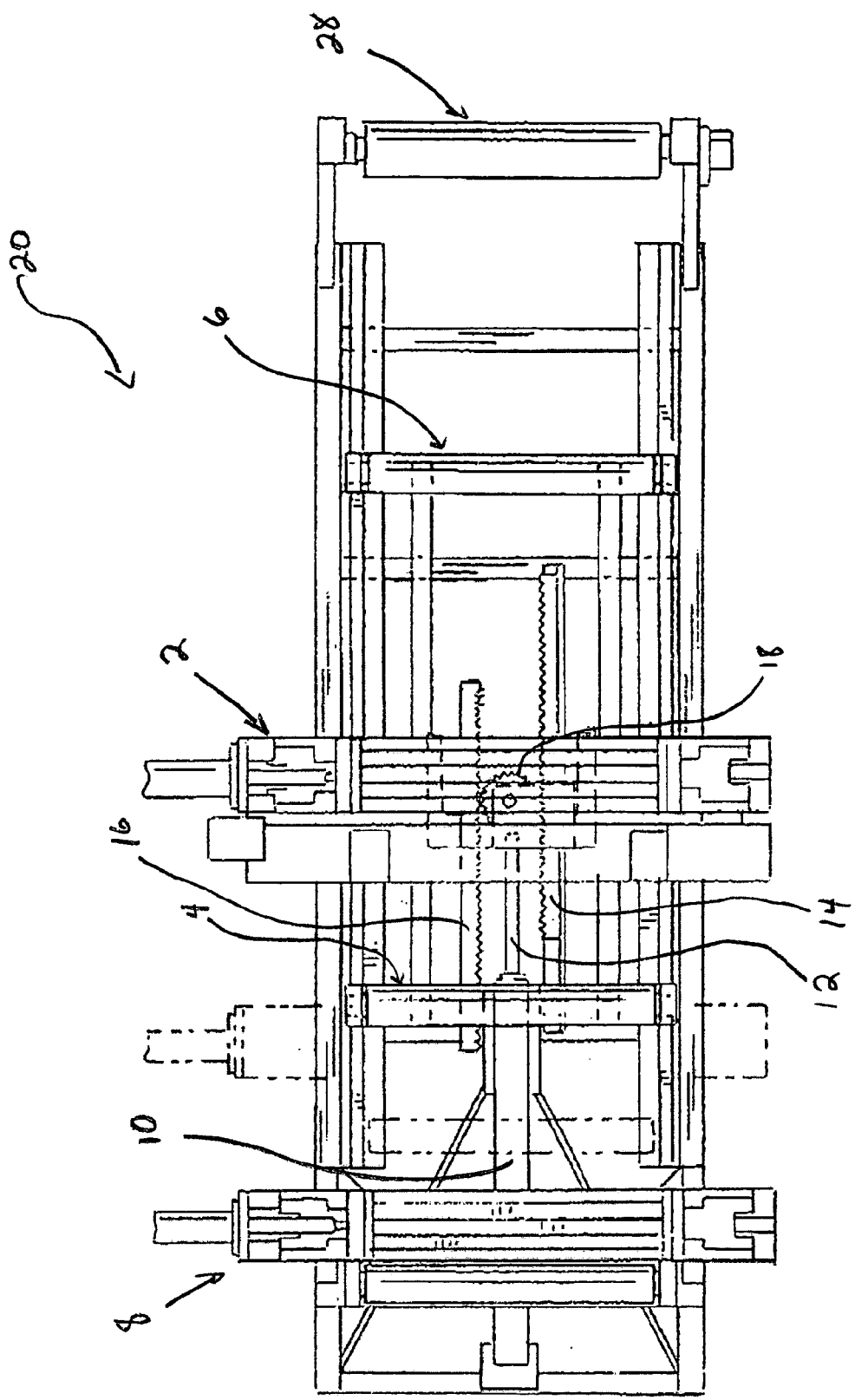
FIG. 3 is a top view of the roller table with the piston in a retracted position.
Figures 7, 8:
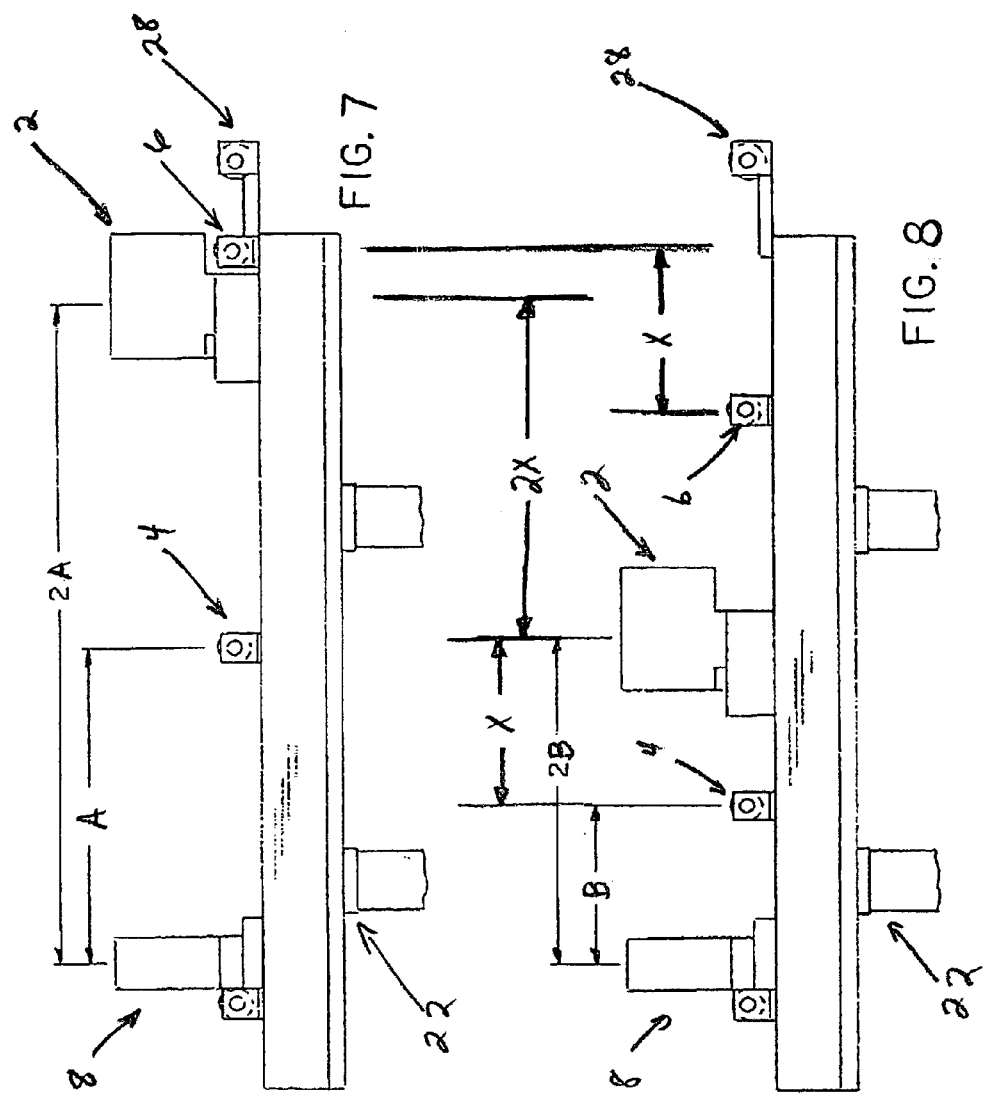
FIGS. 7 and 8 are simplified side view of the roller table for demonstrating the relative movement of the vise carriage and the movable roller supports.

By ensuring that the movable roller supports are equally spaced between adjacent material support points, the likelihood of materially falling into the machine is greatly reduced as compared to the prior art. This characteristic of the present invention is shown by a comparison of FIG. 2, where the piston rod 12 is extended and the vise carriage 2 is located distally from the stationary vise 8, with FIG. 3, where the piston rod 12 is partially retracted and the vise carriage 2 is located at approximately the midpoint of the roller table 20. Turning to FIGS. 7 and 8, two side views of the present invention are shown with the vise carriage 2 in different locations to demonstrate the movement of the movable roller supports 4 and 6 relative to the vise carriage 2. In FIG. 7, the first movable roller support 4 is located a distance A from the stationary vise 8 and, accordingly, the vise carriage 2 is located a distance of approximately 2A from the stationary vise. In FIG. 8, the vise carriage 2 has moved a distance of 2X towards the stationary vise 8 and is now located a distance 2B away from the stationary vise 8. In accordance with the present invention, the first movable roller support 4 remains at approximately the midpoint between the stationary vise 8 and the vise carriage 2 throughout the range of movement of the vise carriage 2 and, thus, is at a distance B from the stationary vise 8. A comparison of FIGS. 7 and 8 also show that the movable roller supports 4 and 6 have moved a distance X, which is ½ the distance traveled by the vise carriage 2.

The present invention is not limited to a mechanism described above. One skilled in the art would know how to modify the present invention to replace the hydraulic cylinder and rack and pinion with servomotors and electronic or computer control. Furthermore, one could modify the present invention to include a plurality of roller supports that are equally spaced between the vise carriage 2 and stationary vise 8 and which travel at various ratios with respect to the vise carriage 2. For example, for an embodiment having two movable roller supports between the stationary vise 8 and the vise carriage 2, the roller support nearest the roller support would move ⅔ the distance of the vise carriage 2 and the roller support nearest the stationary vise 8 would move ⅓ the distance of the vise carriage 2. This can be accomplished using computer controls with servomotors or using a hydraulic cylinder, piston rod and a plurality of racks and pinions, the pinions having various diameters.

What is claimed is:

1. A machine comprising: an at least one roller movably disposed on the machine; a vise carriage movably disposed on the machine for clamping and moving a workpiece; and, a positioning system for adjusting the positions of the vise carriage and the at least one roller wherein a movement of the vise carriage necessarily results in a movement of at least one of the at least one roller.

2. The machine of claim 1 wherein: a distance between the vise carriage and a material support point defines a span; at least one of the at least one roller is movably disposed between the vise carriage and a material support point approximately equally spaced within the span.

3. The machine of claim 2 wherein: the material support point is a stationary vise.

4. The machine of claim 2 wherein: the material support point is a stationary roller.

5. The machine of claim 1 wherein: the positioning system is comprised of at least one servomotor.

6. The machine of claim 1 wherein: the positioning system is comprised of a hydraulic cylinder, a piston rod, a first rack, a second rack, and a pinion; the piston rod movably extends from the hydraulic cylinder and is integral with the pinion, wherein a distance traveled by the piston rod and pinion defines a stroke; the piston rod is also integral with the at least one roller such that the at least one roller travels a distance equal to the stroke; and, the first rack is fixed to the frame and the second rack is fixed to the vise carriage, wherein the vise carriage travels a distance double the stroke.

7. A machine comprising: an at least one roller movably disposed on the machine; a vise carriage movably disposed on the machine for clamping and moving a workpiece; a stationary vise for clamping a workpiece; the at least one roller, the vise carriage, and the stationary vise being support points, wherein the distances between adjacent support points defines a plurality of unsupported spans; and, a positioning system for adjusting the positions of the vise carriage and the at least one moveable rollers to minimize the length of the plurality of unsupported spans.

8. The machine of claim 7 wherein: the positioning system is comprised of a hydraulic cylinder, a piston rod, a first rack, a second rack, and a pinion; the piston rod movably extends from the hydraulic cylinder and is integral with the pinion, wherein a distance traveled by the piston rod and pinion defines a stroke; the piston rod is also integral with the at least one roller such that the at least one roller travels a distance equal to the stroke; and, the first rack is fixed to the frame and the second rack is fixed to the vise carriage, wherein the vise carriage travels a distance double the stroke.

9. The machine of claim 7 wherein: The positioning system is comprised of at least one servomotor.

10. A machine comprising: an at least one roller movably disposed on the machine; a movable vise carriage for clamping and moving a workpiece, wherein a distance between a material support point and the vise carriage defines a span; and, a positioning system for adjusting the positions of the vise carriage and the at least one rollers wherein at least one of the at least one moveable rollers is positioned approximately equally spaced within the span.

11. The machine of claim 10 wherein: the material support point is a stationary vise.

12. The machine of claim 10 wherein: the material support point is a stationary roller.

13. The machine of claim 10 wherein: the positioning system is comprised of a hydraulic cylinder, a piston rod, a first rack, a second rack, and a pinion; the piston rod movably extends from the hydraulic cylinder and is integral with the pinion, wherein a distance traveled by the piston rod and pinion defines a stroke; the piston rod is also integral with the at least one roller such that the at least one roller travels a distance equal to the stroke; and, the first rack is fixed to the frame and the second rack is fixed to the vise carriage, wherein the vise carriage travels a distance double the stroke.

14. The machine of claim 10 wherein: the positioning system is comprised of at least one servomotor.

15. A machine comprising: an at least one roller movably disposed on the machine; a vise carriage movably disposed on the machine for clamping and moving a workpiece; a positioning system for adjusting the positions of the vise carriage and the at least one rollers, wherein a ratio of a velocity of the vise carriage to a velocity of at least one of the at least one rollers is constant.

16. The machine of claim 15 wherein: the ratio is not equal to one.

17. The machine of claim 15 wherein: the positioning system is comprised of a hydraulic cylinder, a piston rod, a first rack, a second rack, and a pinion; the piston rod movably extends from the hydraulic cylinder and is integral with the pinion, wherein a distance traveled by the piston rod and pinion defines a stroke; the piston rod is also integral with the at least one roller such that the at least one roller travels a distance equal to the stroke; and, the first rack is fixed to the frame and the second rack is fixed to the vise carriage, wherein the vise carriage travels a distance double the stroke.

18. The machine of claim 15 wherein: the positioning system is comprised of at least one servomotor.

19. A machine comprising: an at least one roller movably disposed on the machine; a vise carriage movably disposed on the machine for clamping and moving a workpiece; a positioning system for adjusting the positions of the vise carriage and the at least one moveable rollers, wherein a ratio of a distance traveled by the vise carriage to a distance traveled by at least one of the at least one rollers is constant.

20. The machine of claim 19 wherein: the ratio is not equal to one.

21. The machine of claim 19 wherein: the positioning system is comprised of a hydraulic cylinder, a piston rod, a first rack, a second rack, and a pinion; the piston rod movably extends from the hydraulic cylinder and is integral with the pinion, wherein a distance traveled by the piston rod and pinion defines a stroke; the piston rod is also integral with the at least one roller such that the at least one roller travels a distance equal to the stroke; and, the first rack is fixed to the frame and the second rack is fixed to the vise carriage, wherein the vise carriage travels a distance double the stroke.

22. The machine of claim 19 wherein: the positioning system is comprised of at least one servomotor.

23. A machine comprising: an at least one roller movably disposed on the machine; a vise carriage movably disposed on the machine for clamping and moving the workpiece; a positioning system comprising a hydraulic cylinder, a piston rod, a first rack, a second rack, and a pinion; the pinion being in engagement with the first rack and the second rack; the hydraulic cylinder being fixed to a frame of the machine; the piston rod movably extending from the hydraulic cylinder and being integral with the pinion, wherein a distance traveled by the piston rod and pinion defines a stroke; the piston rod also being integral with the at least one moveable roller such that the at least one roller travels a distance equal to the stroke; and the first rack being fixed to the frame and the second rack being fixed to the vise carriage, wherein the vise carriage travels a distance double the stroke.

24. A machine comprising: a vise carriage movably disposed on the machine for clamping and moving the workpiece; a positioning system comprising a hydraulic cylinder, a piston rod, a first rack, a second rack, and a pinion; the pinion being in engagement with the first rack and the second rack; the hydraulic cylinder being fixed to a frame of the machine; the piston rod movably extending from the hydraulic cylinder and being integral with the pinion, wherein a distance traveled by the piston rod and pinion defines a stroke; the first rack being fixed to the frame and the second rack being fixed to the vise carriage, wherein the vise carriage travels a distance double the stroke.

25. A machine comprising: an at least one roller movably disposed on the machine; a vise carriage movably disposed on the machine for clamping and moving the workpiece; a positioning system comprising a hydraulic cylinder, a piston rod, a plurality of racks, and a plurality of pinions having different diameters; the hydraulic cylinder being fixed to a frame of the machine; the piston rod movably extending from the hydraulic cylinder and being integral with the plurality of pinions, wherein a distance traveled by the piston rod and the plurality of pinions defines a stroke; the plurality of pinions being in engagement with the plurality of racks whereby a distance traveled by each of the plurality of pinions is a multiple of the stroke; one of the plurality of racks being fixed to the frame; one of the plurality of racks being fixed to the vise carriage; and, one of the plurality of racks being fixed to at least one of the at least one roller.

26. A machine comprising: an at least one roller movably disposed on the machine; a vise carriage movably disposed on the machine for clamping and moving a workpiece; a distance traveled by the vise carriage defines a stroke; and, a positioning system for adjusting the positions of the vise carriage and the at least one roller wherein at least one of the at least one roller moves at a constant rate throughout the stroke.

* * * * *